June 29, 1937.   E. G. STAUDE   2,085,550
SINGLE PEDAL CONTROL FOR MOTOR VEHICLES
Filed Dec. 16, 1932   4 Sheets-Sheet 3
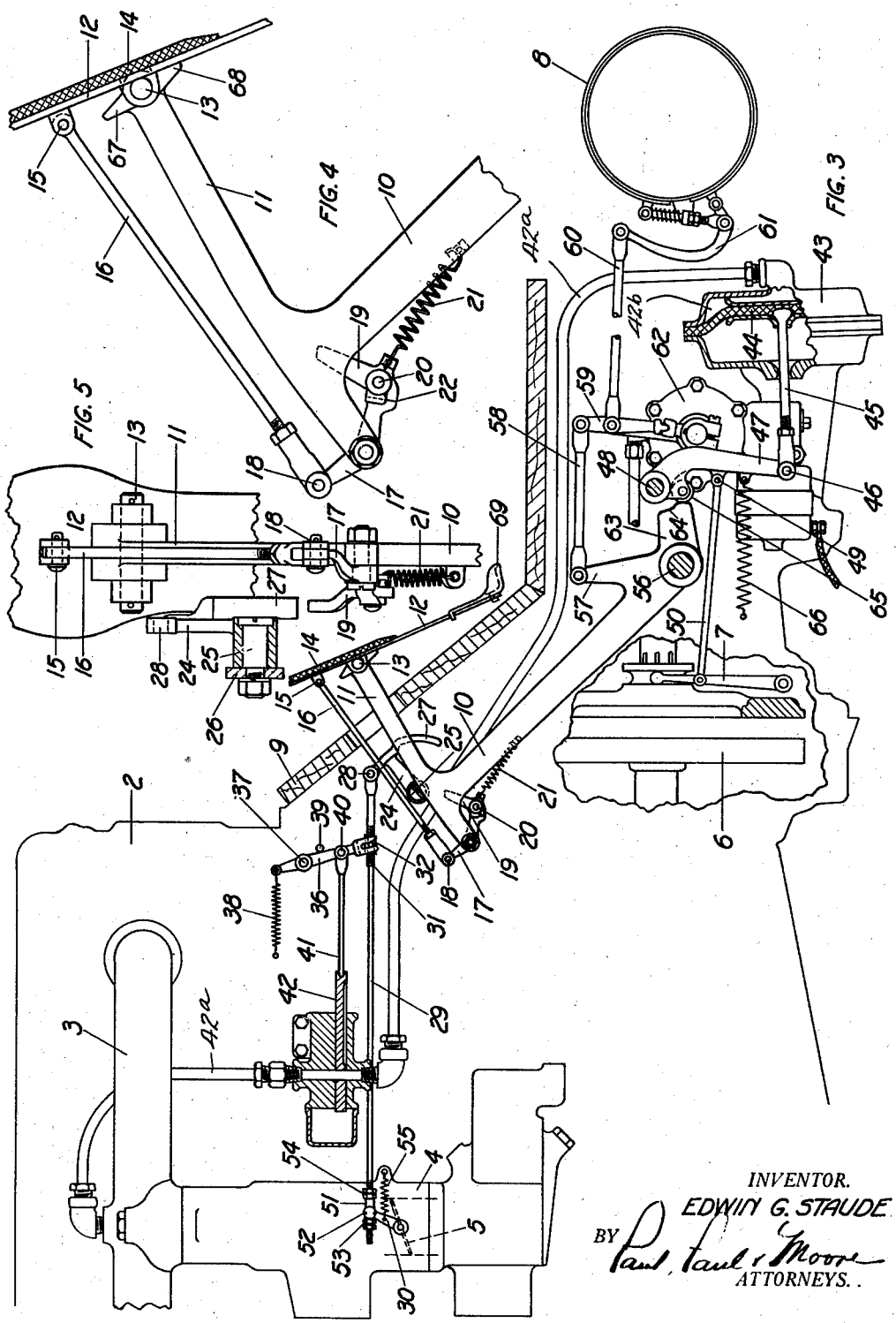
INVENTOR.
EDWIN G. STAUDE
BY
ATTORNEYS.

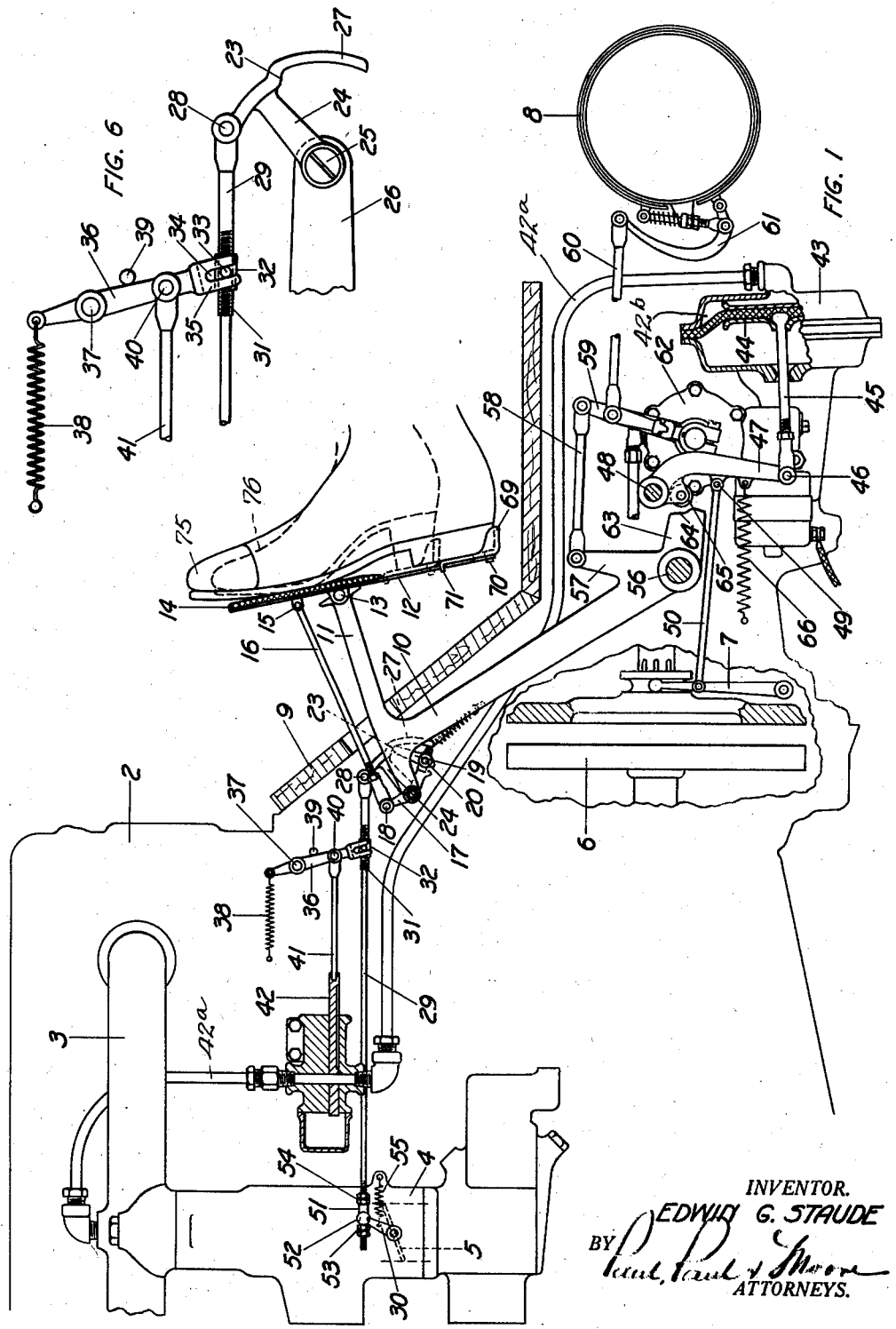

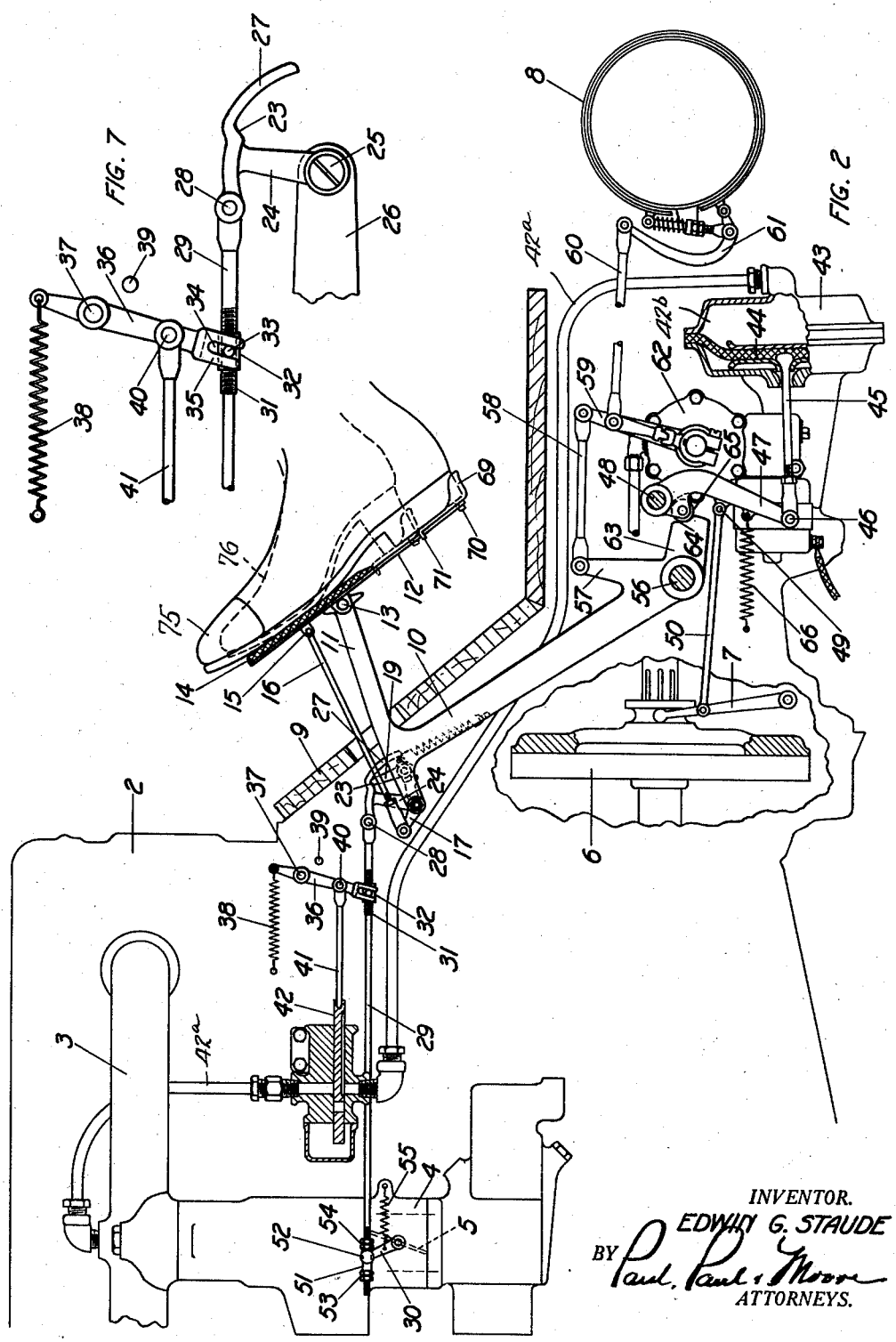

June 29, 1937.  E. G. STAUDE  2,085,550
SINGLE PEDAL CONTROL FOR MOTOR VEHICLES
Filed Dec. 16, 1932  4 Sheets-Sheet 4
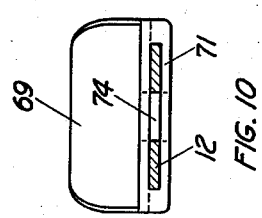
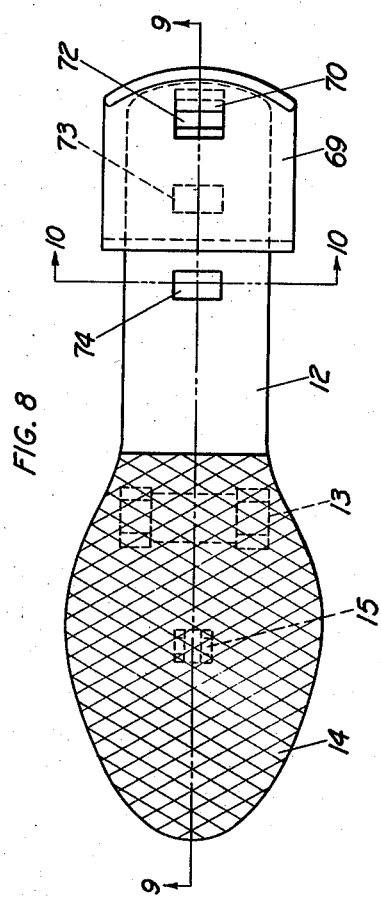
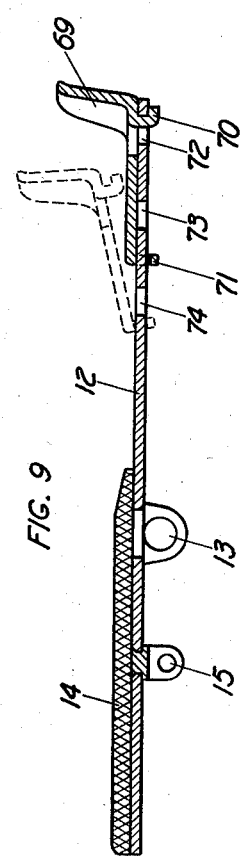
INVENTOR.
EDWIN G. STAUDE
BY
ATTORNEYS.

Patented June 29, 1937

2,085,550

UNITED STATES PATENT OFFICE 2,085,550

SINGLE PEDAL CONTROL FOR MOTOR VEHICLES

Edwin G. Staude, Minneapolis, Minn.

Application December 16, 1932, Serial No. 647,573

11 Claims. (Cl. 192—.01)

This invention relates to improvements in plural control mechanisms for motor vehicles. An important object is to provide a single pedal control for the engine throttle, for the clutch, and for the brake of a motor vehicle.

Another important object of this invention is to provide means whereby the throttle will automatically close and the clutch will automatically be disengaged immediately upon depression of the foot pedal, regardless of the position or angle of the treadle on the foot pedal. Thus should the driver become confused and suddenly depress the pedal and neglect to close the throttle and disengage the clutch (by rocking the treadle in the proper manner) the throttle will be automatically closed and the clutch will be automatically disengaged as a result of merely depressing the pedal.

Objects, features and advantages of the invention will be set forth in the description of the drawings forming a part of this application, and in said drawings:

Figure 1 is a side elevation showing my invention applied to a conventional type of automobile, showing the transmission case and the floorboards as well as the outline of the motor, together with the carburetor and intake manifold. This view shows the pedal with the foot treadle in the normal position with the engine throttle closed and the clutch disengaged and the brakes released;

Figure 2 is a view similar to Figure 1, except that the treadle on the pedal is rocked into a position where the clutch is engaged and the engine throttle wide open;

Figure 3 is a view similar to Figure 1, except that the position of the treadle and pedal is such that the throttle is closed, the clutch is disengaged, and the brakes are applied. The degree of depression of the pedal will, of course, determine the degree of brake application;

Figure 4 is an enlarged view of the upper section of the pedal showing the treadle and its connections in the position shown in Figure 3;

Figure 5 is an end view of Figure 4;

Figure 6 is a detail showing connections for the engine throttle control rod and the vacuum control valve for disengaging the clutch, together with the pivoted sector which is operated by the treadle only when the pivoted foot pedal is in its extreme outward position from the floorboards. The position of this mechanism is similar to that shown in Figure 1 and Figure 3;

Figure 7 is a view similar to Figure 6, except the position of the mechanism is shown the same as that in Figure 2;

Figure 8 is a top view of the adjustable foot treadle;

Figure 9 is a section on line 9—9 of Figure 8, looking in the direction of the arrows; and Figure 10 is a section on line 10—10 of Figure 8, looking in the direction of the arrow.

In the drawings, 2 represents the outline of a motor of conventional type, 3 the manifold, and 4 a carburetor connection showing a conventional type of butterfly throttle valve in dotted lines at 5. Numeral 6 is a general outline of a conventional type of clutch controlled by a clutch-releasing arm 7, and 8 represents a conventional type of brake, 9 the floorboards of the vehicle, and 10 a single pedal control lever embodying part of my invention. Mounted on the upper projection 11 of the pedal 10 is a treadle 12 pivoted at 13. The treadle 12 is covered with suitable anti-friction material, such as rubber, at 14. Pivoted to the upper end of the treadle 12 at 15 is a rod 16 which is connected to an arm 17 of a bellcrank at 18. The opposite end of the bellcrank 17 has a pawl 19 pivoted at 20 in the bellcrank and held in the outward position by a spring 21 against a stop comprising suitable lugs at 22 on both the pawl 19 and one arm of the bellcrank 17. This pawl constitutes a thrust member slidable along another member having a shoulder with which member 19 engages. When the pedal is in its clear up or out position, the pawl 19 is adapted to act against the shoulder 23 of arcuate member 27 of sector 24. This arcuate member constitutes a second thrust member. The sector 24 is pivoted at 25 to a bracket 26 secured to any suitable point on the motor. The extension 27 serves also as a guide for the pawl or thrust member 19 if, for any reason, the sector 24 should remain in the position shown in Figure 7 and the pawl 19 in the position shown in Figure 1.

Pivoted at 28, to sector 24, is a rod 29 which is connected at its opposite end to an arm 30 that operates the butterfly valve 5. The rod 29 is threaded at the point 31 and adapted to receive a square nut 32 having projections 33 adapted to operate in a slot 34 of a fork 35 on an arm 36, of a lever pivoted at 37 in any suitable manner. The arm is held in the position shown in Figure 1 by a spring 38, against a suitable stop 39. This stop acts to properly dispose the member 27 in operative relation to thrust member 19. Pivoted at the point 40 on the arm 36 is a rod 41 which is connected to the valve 42, controlling the vacuum in the booster 43. This booster is provided with a piston 44, having rod 45 which connects at 46 to an arm 47, pivoted as at 48. Pivoted at 49 on the arm 47 is a rod 50 which operates the clutch control lever 7. The valve 42 is of the slide type and controls a suction conduit or connection 42ᵃ between the manifold 3 and the chamber 42ᵇ of the booster 43. As long as the vacuum is maintained in the chamber, through open valve 42, the clutch will remain open, as in Figure 3. As soon as the valve is closed, and the vacuum interrupted, the spring 66 (or the clutch spring, not shown) will move the clutch to closed position. There is no intention to limit the invention entirely to the use of a vacuum, because other fluid operable devices can be used to control the clutch.

When the arm 36 is in the position shown in Figure 1, the vacuum valve 42 is open, obtaining vacuum in the booster 43, which, through the connections 44, 45, 47, 50, results in disengagement of the clutch. The clutch, however, cannot be disengaged until after the throttle 5 has been closed, there being a sufficient delay in opening of the vacuum valve 42 so that vacuum is not established until after such closure. This is accomplished by providing for lost motion in the throttle arm 30 by means of a sleeve 51 on the rod 31. The fork 52 on the arm 30 partly encircles the sleeve 51 and strikes the adusting nuts 53 and 54. The proper position of the parts to obtain this delay may be had by adjusting the jamb nuts 53 and 54. A spring 55 serves to hold the throttle closed at all times.

The pedal 10 is pivoted at 56 and has a short arm 57 to which connecting link 58 is attached, said link being attached to a brake power amplifier operating rod 59, to which rod is connected a brake rod 60, in turn connected to the brake mechanism control arm 61 of the conventional brake 8. Numeral 62 generally indicates a brake power amplifier of any preferred type controlled by the pedal to generate and apply booster braking power, such for example as the type shown in my Patent No. 1,785,052 for Automatic brake control for power propelled vehicles. In these devices, depression of the pedal results in the generation of auxiliary power, and the power is applied for operating the brakes, as long as the pedal is depressed. The arrangement is such that the brakes can be directly pedal-operated in case the power-amplifying unit fails. The drawings illustrate a type of braking power amplifying device in which appropriate movement of the lever 59 by the pedal 10 closes a motor circuit switch (not shown) which results in the generation of fluid pressure by means of pumping gears (not shown) which pressure operates the brake through rod 60.

In order to cause a slight resistance on the pedal and permit the foot to rest its full weight of from twelve to twenty pounds on the treadle during normal driving, I provide an initial resistance by an extension 63 on the pedal 10 near the pivot 56, the extension having a depressed portion 64 and adapted to receive a roller 65 secured to the arm 47. A spring 66 normally keeps the arm 47 in the position shown in Figure 2 with the clutch engaged, and when in this position, the roller 65 will be in the position shown in Figure 2. This is a feature of the invention. The first act of pedal depression by the foot is to overcome the resistance due to the depression 64 on the projection 63, to bring the parts to the position shown in Figure 3. After the resistance has been overcome, the roller 65 rides on the radial part of the surface. By the time this pressure has been overcome, the entire pedal effort has been applied to open the clutch, and the brake controlling members are operative. Suitable stops 67 and 68 are provided in the part 11 of the pedal 10, to limit motions of treadle 12.

Due to the fact that the power for applying the brakes and disengaging the clutch are amplified through separate power mechanisms, the movement of the pedal during maximum depression need only be a small portion of that which is required normally. In fact, I have designed this pedal for a depression of only two and one-half inches for a maximum brake applying position. This stroke may be further reduced by the proper arrangement of the connections and the proper sizing of the power amplifiers.

A feature is a suitable adjustable heel support 69 to adapt the treadle 12 for the most comfortable operating position for different sizes of shoes. For this purpose, I provide notches 72, 73 and 74 in the treadle plate 12, and I provide the heel support 69 with a hook 70 to engage through the slots 72, 73 and 74, and at the forward end of the heel support 69. There is also provided a slot at 71 through which the treadle plate 12 slides. In Figure 9 there has been shown the heel support 69 in raised position in dotted lines, in which position the heel support is slidable along the treadle 12 to interlock in the other slots 73 or 74. In Figure 1, there has been shown a large shoe 75 and its position on the treadle showing how the heel of the shoe rests on the support 69. In the same figure, there has been shown a small shoe 76 in dotted lines with the heel support 69 moved up, also in dotted lines to more clearly indicate the purpose of the heel support 69 for balancing the center or ball of the foot over the pivot 13.

From the above description, it is clear that should the driver suddenly depress the pedal, the brakes will be applied and the motor will not race, due to the fact that the throttle automatically closes because of the spring 55, and the clutch automatically is disengaged through the action of the spring 38. Immediately, however, that the brakes are released, should the pedal return with the treadle in the position it was in when depressed, the driver merely has to rock the treadle into the position shown in Figure 1 and thereby immediately re-engage the pawl 19 with the projection 23 on the sector 24 to again control the throttle and clutch operating members in the normal manner.

I do not wish to limit my single pedal control treadle to the particular construction shown because, obviously, the pedal may be varied in design without departing from my invention.

*Operation*

With the parts in the position shown in Figure 1, it is assumed that the clutch is held open, due to the vacuum action through the open valve 42. The throttle is closed. To open the throttle, the foot is moved from the position of Figure 1 to the position shown in Figure 2, rocking the treadle forwardly, and by means of member 19 acting against the shoulder 23 of the arcuate member 27, the latter is swung in counter-clockwise direction, to open the throttle. However, before the throttle 5 is opened, forward movement of the rod 29, operating through the lever 36, closes the vacuum valve 42 and engages the clutch, see Figure 2, it being understood that the engine vacuum has up to this time been maintaining the clutch in open position. If the engine is not running, the clutch will be in, because with the pedal retracted, and with no vacuum, the clutch automatically closes by means of its spring.

Now, suppose that while the treadle is in throttle-open position, it is desired to apply the brakes. On depression of the pedal 10, member 19 is moved away from element 27, as shown in Figure 3, element 27 moves in clockwise direction and the throttle moves automatically to closed position; also the valve 42 moves to open position.

If the engine is not operating to produce the vacuum, unclutching is accomplished directly by engagement of element 64 of the pedal with the roller of the lever 47. Referring to Figure 1, it is noted that the valve 42 is opened, to disengage the clutch, before the throttle is closed. This is provided for by the lost motion connection at 51—52—53—54. As before stated, in order to cause a slight resistance on the pedal and permit the foot to rest its full weight during normal driving, the roller 65 of arm 47 forms a stop, see Figure 2.

When the brake pedal is released from its position shown in Figure 3 the reverse process, of course, takes place, that is the arm 47 is released but if the engine is running the vacuum maintains the arm in the position shown in Figure 3 while the pedal moves to the position shown in Figure 1. If the engine is not running, the arm 47 follows the movement of the arm 63 as the pedal is retracted and the clutch moves to closed position. During this time, the valve 42 is open, as shown in Figure 3, and it is noted that until the pedal assumes the position shown in Figure 1, the throttle 5 and valve 42 cannot be controlled by the treadle.

Features of this invention include the thrust relation of elements 27 and 19 or their equivalents, between the treadle controlled part of the throttle control mechanism, and the other part which is operable independently of the pedal; any means by which the operative relation between these two portions of the throttle control or other mechanism is destroyed substantially immediately on initial motion of the pedal in one direction, including brake-applying direction, and is restored substantially when the brake (or other) pedal returns to the initial position or reaches its fully retracted position; the relation between the parts 19 and 27 in which the element 19 lies forwardly of the element 27 in direction towards the front of the automobile or forwardly in direction of motion of any pedal or the like, so that it is moved away from this part on initial motion of the pedal in brake-applying direction; the use of two and separable section throttle control; the use of this two section throttle control with one section movable with the pedal and the other mounted independently of the pedal; the idea of a contact relation rather than any positive connection, that is the idea of an impositive connection between the two sections of the throttle control mechanism; the operation of the valve 42 controlling the booster, as the result of movement of that part of the throttle control element which is not mounted on the pedal; the means 51—53—54 or its equivalent for adjusting the relations between the valves 42 and 5, or any two valves, to have them operate one before the other when a pedal or lever moves in a certain direction; the specific application of the principle of the control of a valve which controls an automobile clutch mechanism and a throttle valve; to the principle of utilizing an element like 47 as a means cooperative with means like 64 carried by the brake pedal to increase the resistance of depression of the pedal 10; all details of construction shown; and all broader ideas of means disclosed, or inherent in the specification, or drawings, or claims.

I claim as my invention:

1. In combination with an automobile having a brake pedal and a clutch, means for controlling the clutch including a movable member, said movable member and a portion of the brake pedal being cooperable in a manner to yieldably resist depression of the pedal and to cause said member to move in clutch opening direction, said clutch control means including a valve and means by which the pedal controls the valve to obtain clutch opening action during pedal depression.

2. In combination with an automobile having a clutch, brake mechanism, and motor throttle, a single pedal control for the throttle, clutch, and brake mechanism comprising a brake pedal having an oscillating treadle connected to an oscillatable spring retractable mechanism, a pivoted arm operably connected with the engine throttle, and with a vacuum control valve as part of a clutch control mechanism, said arm being adapted to be engaged by said oscillating spring retracted mechanism to move the same in one direction by rocking the treadle, and a retractor spring for bringing the said arm back to its normal position when either the motion of the treadle is reversed, or when the pedal including the treadle, is depressed to apply the brakes.

3. In combination with an automobile having a clutch, brake mechanism, and motor throttle, a single pedal control for the motor car throttle and clutch comprising a brake pedal provided with an oscillating treadle, said treadle being connected to an oscillating spring retracted mechanism, a pivoted arm having connections with the engine throttle and the vacuum control valve as part of a clutch control mechanism, said arm being pivoted and being adapted to be engaged by said oscillating spring retracted mechanism to move the same in one direction by rocking the treadle, and a retractor spring for bringing the said arm back to its normal position when either the motion of the treadle is reversed, or when the pedal, including the treadle, is depressed to apply the brakes.

4. In combination with an automobile having a brake mechanism and motor throttle, a single pedal control for the throttle and brake mechanism comprising a brake pedal provided with an oscillating treadle, said treadle being connected to an oscillating spring-retracted mechanism, a pivoted arm having connections with the engine throttle, said arm being pivoted and being adapted to be engaged by said oscillating spring-retracted mechanism to move the same in one direction by rocking the treadle, and a retractor spring for bringing the said arm back to its normal position when either the motion of the treadle is reversed, or when the pedal including the treadle is depressed to apply the brakes.

5. In combination with an automobile having an engine throttle clutch and brake mechanism, a single pedal control for the throttle, clutch and brake mechanism, comprising a brake pedal, means for causing increased initial resistance against pedal depression, said pedal having an oscillating treadle, said treadle being connected to an oscillating spring-retracted mechanism, a pivoted arm having connections with the engine throttle, and the vacuum control valve for the clutch, said arm being pivoted and being adapted to be engaged by said oscillating spring-retracted mechanism to move the same in one direction by rocking the treadle, and a retractor spring for bringing the said arm back to its normal position when either the motion of the treadle is reversed, or when the pedal including the treadle is depressed to apply the brakes.

6. A single pedal control for the motor car having, a throttle, clutch and brake, comprising, a pedal provided with an oscillating treadle, said treadle being connected to an oscillating spring-retracted mechanism, a pivoted arm having connections with the engine throttle and a vacuum control valve for the clutch, said arm being adapted to be engaged by said oscillating spring-retracted mechanism to move the same in one direction by rocking the treadle, and a retractor spring for bringing the said arm back to its normal position when either the motion of the treadle is reversed or the pedal including the treadle is depressed when applying the brakes.

7. In combination with a brake pedal of an automobile, an engine throttle, control means including pivoted parts each swingable on an axis substantially parallel to the pivotal axis of the pedal, a first part including a lever pivoted on the pedal and having a finger pivoted thereto, and a second part including a shouldered arcuate member pivoted independently of the pedal, and engageable by the finger to be oscillated only when the brake pedal is fully retracted, and means arranged on the pedal for operating the first part to cause the finger to engage a shoulder of the arcuate portion to move the throttle to open position, and means for automatically moving the throttle to closed position.

8. In an automobile having an engine, an engine throttle, a brake pedal, and a clutch, fluid operable means for controlling the clutch including a movable member controlled by the pedal to open the clutch when the pedal is depressed but movable independently of the pedal, and including a valve for controlling the fluid operable means, means for operating the valve, including a member on the pedal and an independently movable member for operating the valve and throttle, the members being separable when the pedal is depressed and being adapted to assume cooperating relation when the pedal is retracted, means on the pedal movable independently thereof and connected with said pedal member for operating said independent means to move the valve to obtain clutch closure and then open the throttle.

9. In combination with an automobile having an engine, a manifold therefor, an engine throttle, a brake pedal, a clutch, a clutch control mechanism including a device operated by suction from the engine manifold to open the clutch and including a valve, means in part carried by the pedal and in part mounted independently thereof and cooperable with means controlling said valve to move the valve to obtain release of the clutch and then open the throttle, and means by which the pedal can independently operate the clutch control mechanism to open the clutch when the pedal is depressed.

10. A single pedal control for a motor car having a throttle, clutch and brake, comprising a pedal having an oscillating treadle, fluid operable means for controlling the clutch including a valve which is arranged forwardly of the brake pedal adjacent the engine throttle, means movable to control the valve and throttle to close the valve and then open the throttle, means on the pedal cooperable with the last mentioned means when the pedal is retracted and operable by said treadle to control the valve and throttle as aforesaid, and means carried by the pedal rearwardly of its pivot and cooperable as a stop with the movable part of said fluid controlling means to open the clutch when the pedal is depressed.

11. In combination with an automobile having an engine throttle, a clutch, a control member for the clutch, fluid-operable means for controlling the clutch including a valve, a brake mechanism including a brake pedal having a treadle, the pedal being normally retracted, means movable on the pedal to control the throttle, and means controlled by said last mentioned means to control the throttle only when said pedal is retracted or in non-brake-applying position, means operable by the last mentioned means to operate the valve to cause the clutch to open before the throttle opens, said clutch control member including a member movable independently of said fluid-operable means, and directly operable by the pedal to open the clutch on depression of the pedal.

EDWIN G. STAUDE.